US009946661B2

(12) United States Patent
Tseng et al.

(10) Patent No.: US 9,946,661 B2
(45) Date of Patent: Apr. 17, 2018

(54) COMMAND EXECUTING METHOD, MEMORY CONTROLLER AND MEMORY STORAGE APPARATUS

(71) Applicant: PHISON ELECTRONICS CORP., Miaoli (TW)

(72) Inventors: Ming-Hui Tseng, Hsinchu (TW); Chian-Hung Hou, Miaoli County (TW); Chao-Sung Yeh, Miaoli County (TW)

(73) Assignee: PHISON ELECTRONICS CORP., Miaoli (TW)

(*) Notice: Subject to any disclaimer, the term of this patent is extended or adjusted under 35 U.S.C. 154(b) by 145 days.

(21) Appl. No.: 14/038,757

(22) Filed: Sep. 27, 2013

(65) Prior Publication Data
US 2015/0039909 A1 Feb. 5, 2015

(30) Foreign Application Priority Data

Aug. 1, 2013 (TW) .............................. 102127642 A

(51) Int. Cl.
G06F 12/14 (2006.01)
G06F 21/14 (2013.01)
G06F 21/78 (2013.01)
G06F 21/80 (2013.01)

(52) U.S. Cl.
CPC ...... G06F 12/1408 (2013.01); G06F 12/1466 (2013.01); G06F 21/14 (2013.01); G06F 21/78 (2013.01); G06F 21/80 (2013.01); G06F 21/805 (2013.01)

(58) Field of Classification Search
CPC .......... G06F 12/00; G06F 21/78–21/79; G06F 21/80; G06F 21/805; G06F 12/14; G06F 12/145
See application file for complete search history.

(56) References Cited

U.S. PATENT DOCUMENTS

| 2002/0083283 | A1* | 6/2002 | Barret | G06F 12/1433 |
| | | | | 711/163 |
| 2005/0157178 | A1* | 7/2005 | Miyata | H04N 5/23245 |
| | | | | 348/207.99 |
| 2006/0015748 | A1* | 1/2006 | Goto | G06F 21/52 |
| | | | | 713/190 |
| 2006/0062383 | A1* | 3/2006 | Kaneda | G06F 3/0622 |
| | | | | 380/28 |

(Continued)

Primary Examiner — John B King
Assistant Examiner — Arya Golriz
(74) Attorney, Agent, or Firm — JCIPRNET

(57) ABSTRACT

A command executing method for a memory storage apparatus is provided. The method includes grouping logical addresses into logical address groups and assigning a key for each of the logical address groups independently. The method also includes receiving a write command and write data corresponding to the write command and temporarily storing the write data into a buffer memory. The method further includes executing the write command, enabling a direct memory access once to transfer the write data from the buffer memory to a writable non-volatile memory module of the memory apparatus and encrypting each sector data of the write data with keys corresponding to the logical address groups that the logical address storing the sector data belong to.

21 Claims, 10 Drawing Sheets

(56) References Cited

U.S. PATENT DOCUMENTS

| | | | |
|---|---|---|---|
| 2006/0161739 A1* | 7/2006 | Genty | G06F 12/1466 |
| | | | 711/152 |
| 2010/0161887 A1* | 6/2010 | Nakazumi | 711/103 |
| 2010/0268864 A1* | 10/2010 | Ramiya Mothilal | 711/103 |
| 2012/0226887 A1* | 9/2012 | Culley | G06F 12/0246 |
| | | | 711/202 |

* cited by examiner

COMMAND EXECUTING METHOD, MEMORY CONTROLLER AND MEMORY STORAGE APPARATUS

CROSS-REFERENCE TO RELATED APPLICATION

This application claims the priority benefit of Taiwan application serial no. 102127642, filed on Aug. 1, 2013. The entirety of the above-mentioned patent application is hereby incorporated by reference herein and made a part of this specification.

BACKGROUND

Technology Field

The present invention relates to a command executing method, and a memory controller using the method, and a memory storage apparatus using the method.

Description of Related Art

The rapid growth in the popularity of digital cameras, cellular phones, and MP3 players in recent years has brought about the escalated demand for storage media by consumers. Since a rewritable non-volatile memory (e.g., a flash memory) has several characteristics such as non-volatility of data, low power consumption, small size and non-mechanical structure, the rewritable non-volatile memory is the most suitable memory to be adopted in a portable multimedia device mentioned above.

Conventionally, a rewritable non-volatile memory module is controlled by a memory controller and connected to a host system through a connector. The host system gives a command to the memory controller to access data in the rewritable non-volatile module. In order to protect data stored in the rewritable non-volatile memory module, a technique has been developed for encrypting the data before the data is written into the rewritable non-volatile memory module. However, when a plurality of data from the host system by a write command belongs to a plurality of different groups and it is requested to encrypt the data with different keys respectively according to the different groups, in the current technique, the data first is temporarily stored into a buffer memory. Then, each portion of the data is read from then buffer memory and encrypted, and the encrypted portion of the data is restored into the buffer memory. Finally, the encrypted data is transmitted and programmed from the buffer memory to the rewritable non-volatile memory in a unit of each physical programming unit. Because several direct memory accesses for the buffer memory are needed for encrypting all data corresponding to one write command, the performance of the memory storage apparatus is influenced seriously.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a command executing, a memory controller, and a memory storage apparatus, which are capable of improving data access efficiency and protecting data individually based on different user groups.

In an exemplary embodiment of the present invention, a command executing method for a memory storage apparatus is provided. The method includes grouping a plurality of logical addresses corresponding to the memory storage apparatus into a plurality of logical address groups and respectively assigning different keys to the logical address groups, wherein each of the logical address groups corresponds one of the keys. The method also includes receiving a write command and write data corresponding to the write command from a host system and temporarily storing the write data into a buffer memory, wherein the write data includes a plurality of sector data and the write command indicates writing the sector data into a plurality of target logical addresses among the logical addresses and the target logical addresses belong to at least two different logical address groups. The method further includes executing the write command, enabling a direct memory access once to transfer the write data from the buffer memory to a rewritable non-volatile memory module and encrypting each of the sector data by using the corresponding different keys according to the logical address groups that the logical addresses storing the sector data belong to.

According to an exemplary embodiment of the present invention, a memory controller including a memory interface, a host interface, a buffer memory, a memory management circuit, a command receiving circuit, a command executing control circuit and an encryption/decryption circuit is provided. The memory interface is coupled to the rewritable non-volatile memory module. The host interface is configured to couple to a host system. The memory management circuit is coupled to the memory interface, the host interface and the buffer memory. The command receiving circuit and the command executing control circuit couple to the memory management circuit and the encryption/decryption circuit couples to the command executing control circuit. The memory management circuit is configured to group a plurality of logical addresses corresponding to the memory storage apparatus into a plurality of logical address groups and respectively assign different keys to the logical address groups, wherein each of the logical address groups corresponds one of the keys. The command receiving circuit receives a write command and write data corresponding to the write command from the host system and temporarily store the write data into the buffer memory, wherein the write data includes a plurality of sector data and the write command indicates writing the sector data into a plurality of target logical addresses among the logical addresses and the target logical addresses belong to at least two different logical address groups. The command executing control circuit is configured to execute the write command, enable a direct memory access once to transfer the write data from the buffer memory to a rewritable non-volatile memory module and the encryption/decryption circuit is configured to encrypt each of the sector data by using corresponding the different keys according to the logical address groups that the logical addresses storing the sector data belong to.

According to an exemplary embodiment of the present invention, a memory storage apparatus including a connector, a rewritable non-volatile memory module and a memory controller is provided. The connector is configured to electrically connect to a host system. The memory controller is coupled to the connector and the rewritable non-volatile memory module. The memory controller is configured to group a plurality of logical addresses corresponding to the memory storage apparatus into a plurality of logical address groups and respectively assign different keys to the logical address groups, wherein each of the logical address groups corresponds one of the keys. The memory controller is further configured to receive a write command and write data corresponding to the write command from a host system and temporarily store the write data into a buffer memory, wherein the write data includes a plurality of sector data and the write command indicates writing the sector data into a plurality of target logical addresses among the logical addresses and the target logical addresses belong to at least two different logical address groups. The memory controller is further configured to execute the write command, enable a direct memory access once to transfer the write data from the buffer memory to a rewritable non-volatile memory module and encrypt each of the sector data by using the different keys according to the logical address groups that the logical addresses storing the sector data belong to.

Based on the above, in the exemplary embodiment of the present invention, the command executing method, the memory controller and the memory storage apparatus are capable of using corresponding keys to encrypt data belongs to different logical address groups in one command by enabling the direct memory access once, thereby improving the performance of data accessing.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

DESCRIPTION OF EMBODIMENTS

Figure 1:
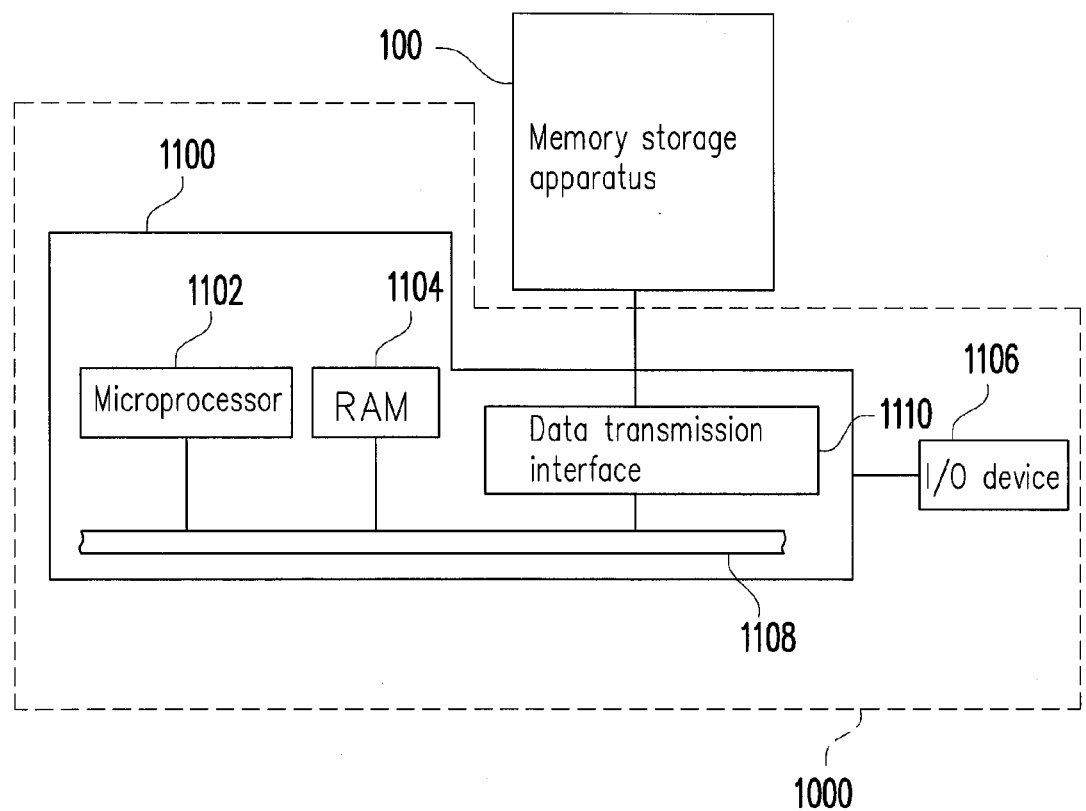
FIG. 1 illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system), typically, includes a rewritable non-volatile memory module and a controller (i.e., a control circuit). The memory storage apparatus is usually used together with a host system, such that the host system can write data into or read data from the memory storage apparatus.

FIG. 1 illustrates a host system and a memory storage apparatus according to an exemplary embodiment of the present invention.

Figure 2:
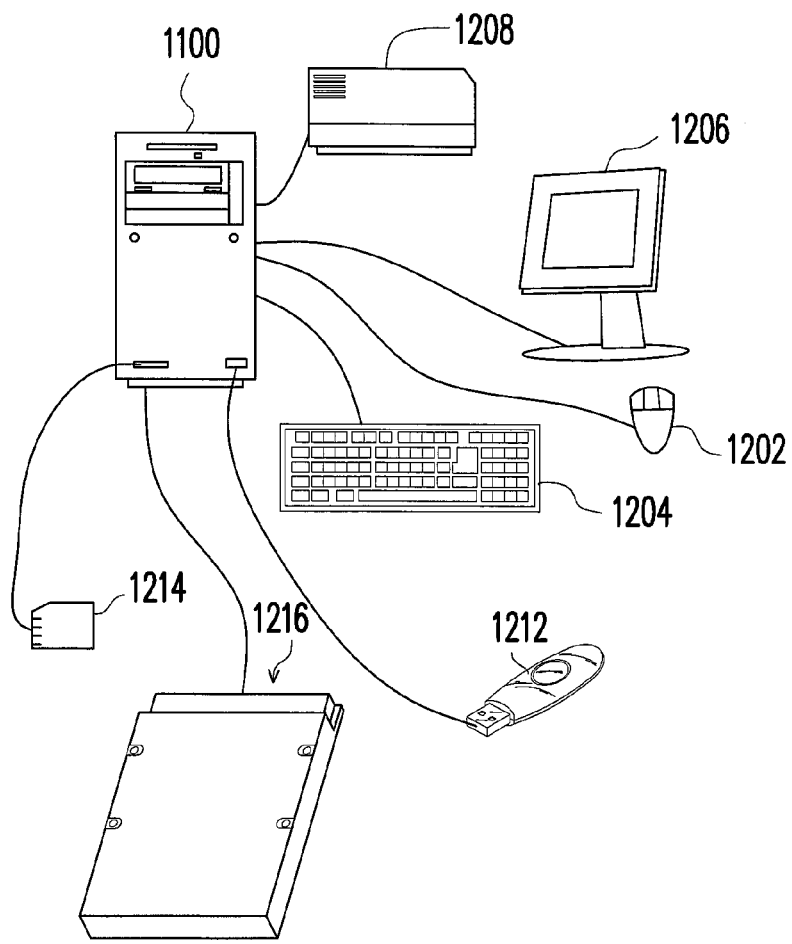
FIG. 2 schematically illustrates a computer, an input/output (I/O) device, and a memory storage apparatus according to the first exemplary embodiment of the invention.

With reference to FIG. 1, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood that, the devices depicted in FIG. 2 should not be construed as limitations to the present disclosure, and the I/O device 1106 may include other devices as well.

In the exemplary embodiment of the present invention, the memory storage apparatus 100 is coupled to other devices of the host system 1000 through the data transmission interface 1110. By using the microprocessor 1102, the random access memory (RAM) 1104 and the Input/Output (I/O) device 1106, data can be write into the memory storage apparatus 100 or can be read from the memory storage apparatus 100. For instance, the memory storage apparatus 100 may be a rewritable non-volatile memory storage apparatus, such as a flash drive 1212, a memory card 1214, or a solid state drive (SSD) 1216 as shown in FIG. 2.

Figure 3:
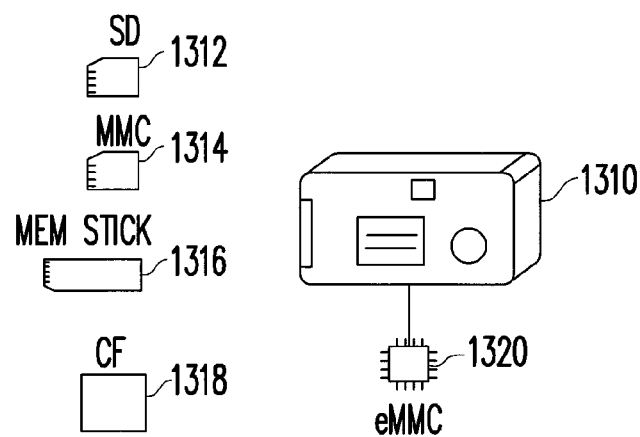
FIG. 3 illustrates a host system and a memory storage apparatus according to an exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage apparatus is an SD card 1312, an MMC card 1314, a memory stick 1316, a CF card 1318$n$ or an embedded storage apparatus 1320 (as shown in FIG. 3). The embedded storage device 1320 includes an embedded MMC (eMMC). It should be noted that the eMMC is directly coupled to a substrate of the host system.

Figure 4:
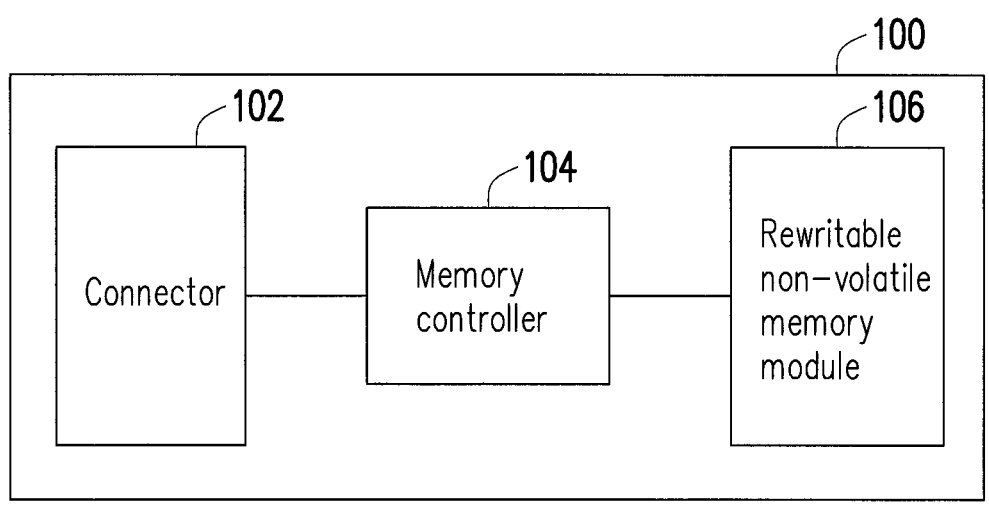
FIG. 4 is a schematic block diagram illustrating the memory storage apparatus depicted in FIG. 1.

FIG. 4 is a schematic block diagram illustrating the memory storage apparatus depicted in FIG. 1.

With reference to FIG. 4, the memory storage apparatus 100 includes a connector 102, a memory controller 104, and a rewritable non-volatile memory module 106.

In the present exemplary embodiment, the connector 102 complies with the serial advanced technology attachment (SATA) standard. However, it should be understood that the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory sick (MS) interface standard, the multi media card (MMC) interface standard, the eMMC interface standard, the universal flash storage (UFS) interface standard, the compact flash (CF) standard, the integrated device electronics (IDE) standard, or other suitable standards.

The memory controller 104 executes a plurality of logic gates or control instructions implemented in a hardware form or a firmware form and performs various data operations according to commands from the host system 1000, such as data writing, reading, and erasing in the rewritable non-volatile memory module 106.

The rewritable non-volatile memory module 106 is coupled to the memory controller 104 and configured to store data written by the host system 1000. The rewritable non-volatile memory module 106 has a plurality of physical erasing units. Each physical erasing unit has a plurality of physical programming units, and the physical programming units of the same physical erasing unit may be written independently and erased simultaneously. For instance, each physical erasing unit is composed of 128 physical programming units. However, the invention is not limited thereto, and each of the physical erasing units may also be comprised of 64, 256, or any other number of physical programming units.

More specifically, the physical erasing unit is the smallest unit for erasing data. Namely, each of the physical erasing units contains the least number of memory cells that are erased all together. The physical programming unit is the smallest unit for programming data. That is, each of the physical programming units is the smallest unit for writing data. Each physical programming unit usually includes a data bit area and a redundant bit area. The data bit area includes a plurality of physical access addresses for storing data of users, and the redundant bit area is configured for storing system data (e.g., control information and error correcting codes). In the present exemplary embodiment, each data bit area of the physical programming unit contains 4 physical access addresses, and the size of each physical access address is 512 bytes (512B). However, in other exemplary embodiments, 8, 16, or more or less number of the physical access addresses may be contained in the data bit area, and the number and the size of the physical access addresses are not limited in the present invention. For instance, in an exemplary embodiment, the physical erasing units are physical blocks, and the physical programming units are physical pages or physical sectors, which should however not be construed as limitations to the invention.

In the present exemplary embodiment, the rewritable non-volatile memory module 106 is a multi-level cell (MLC) NAND flash memory module (i.e., a flash memory module capable of storing data of at least 2 bits in one memory cell). However, the invention is not limited thereto, and the rewritable non-volatile memory module 106 may also be a single-level cell (SLC) NAND flash memory module, a trinary-level cell (TLC) NAND flash memory module, any other flash memory module, or any other memory module with the same characteristics.

Figure 5:
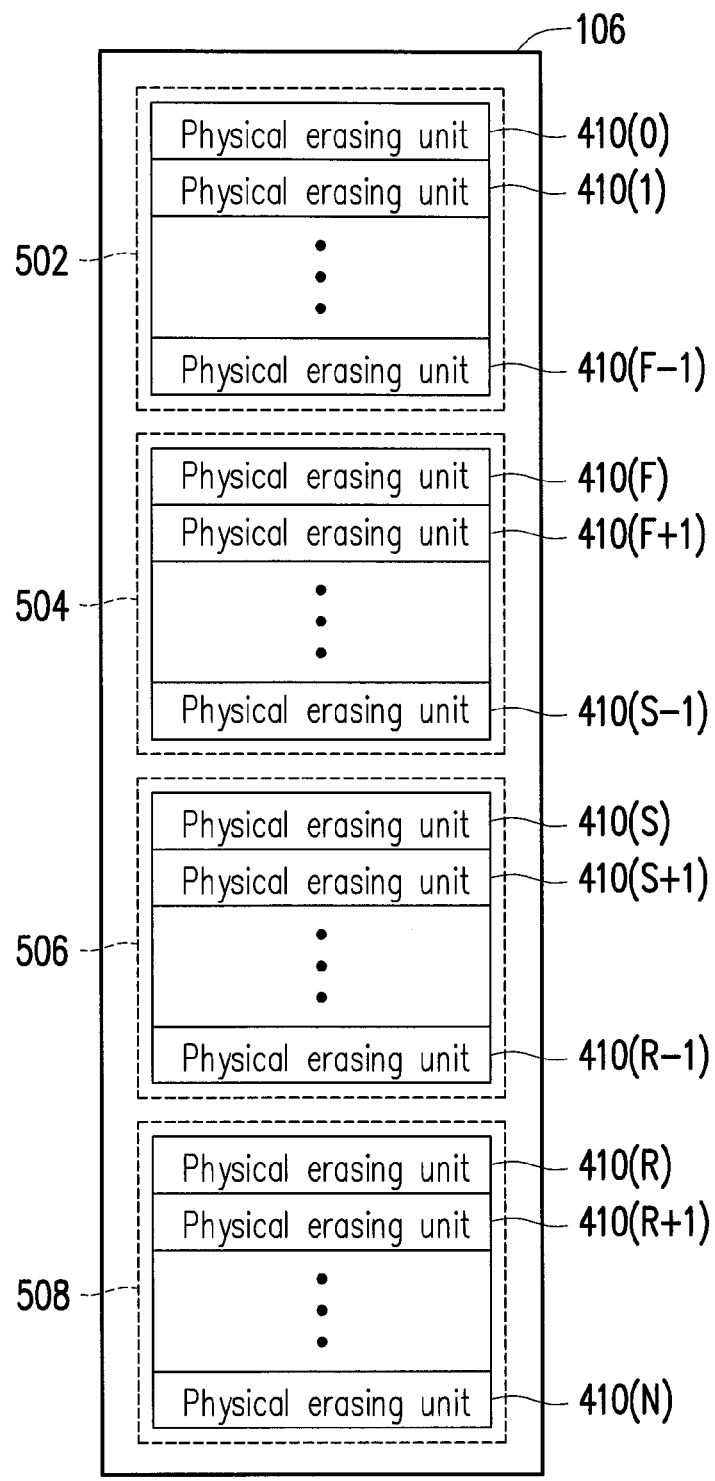
FIG. 5 and FIG. 6 are exemplary diagrams of managing physical erasing units.
Figure 6:
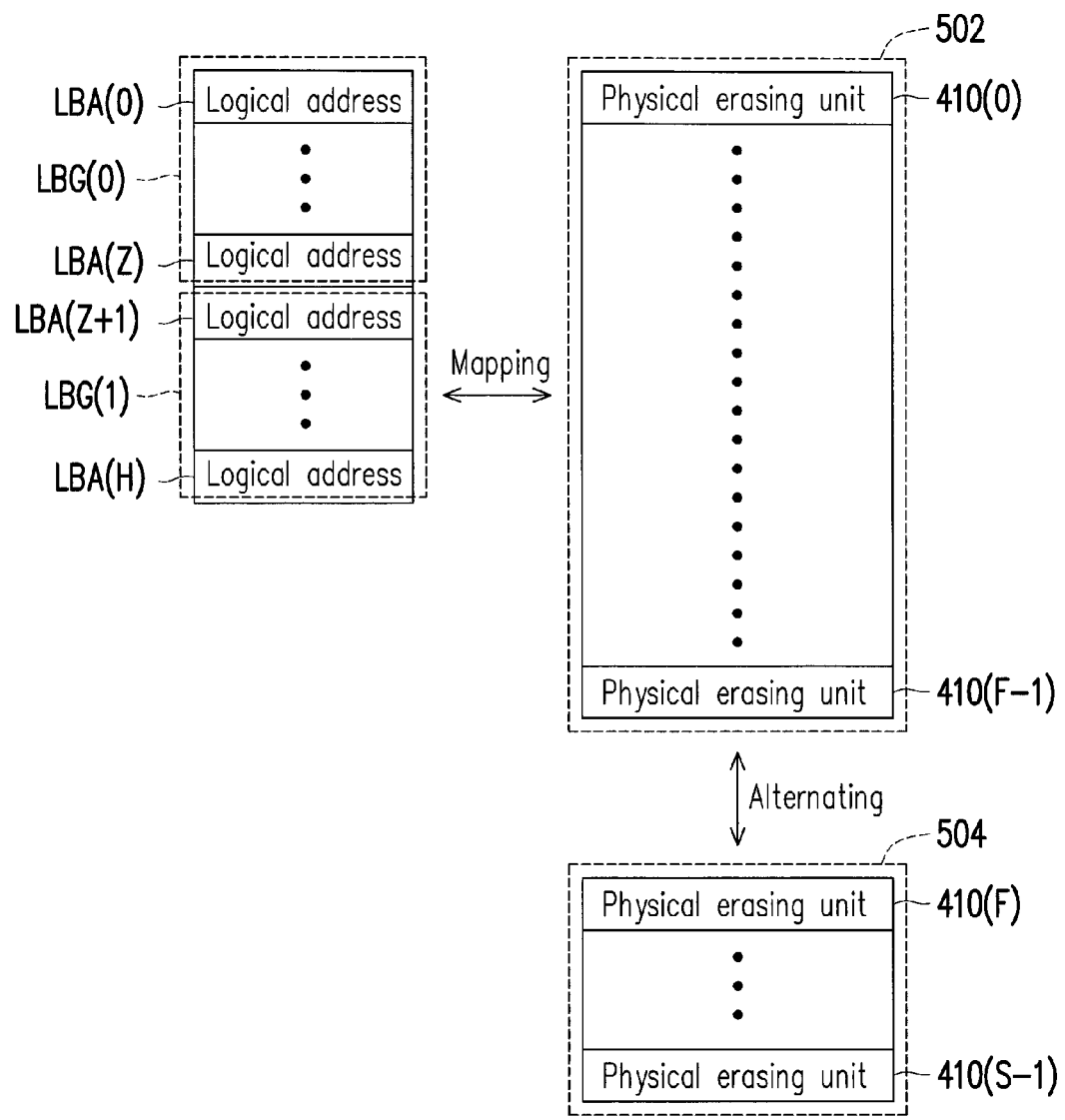

FIG. 5 and FIG. 6 are exemplary diagrams of managing physical erasing units.

With reference to FIG. 5, the memory controller 104 logically groups the physical erasing units 410(0)~410(N) into a data area 502, a free area 504, a system area 506, and a replacement area 508.

The physical erasing units logically belonging to the data area 502 and the spare area 504 are used for storing data from the host system 1000. To be specific, the physical erasing units of the data area 502 are the physical erasing units which have been used for storing data, and the physical erasing units of the free area 504 are the physical erasing units which are used for substituting the physical erasing units of the data area 502. Namely, when a write command and data to be written are received from the host system 1000, the memory controller 104 gets a physical erasing unit from the free area 504 and writes the data into the gotten physical erasing unit for substituting the physical erasing unit of the data area 502.

The physical erasing units logically belonging to the system area 506 are used for recording system data. For instance, the system data includes the manufacturers and models of the rewritable non-volatile memory module, the number of physical erasing units in the rewritable non-volatile memory modules, the number of physical programming units in each physical erasing unit, and so on.

Physical erasing units logically belonging to the replacement area 508 are used in a bad physical erasing unit replacement procedure for replacing damaged physical erasing units. Particularly, if there are still normal physical erasing units in the replacement area 508, and a physical erasing unit in the data area 502 is damaged, the memory controller 104 selects a normal physical erasing unit from the replacement area 508 to replace the damaged physical erasing unit.

In particular, the numbers of physical erasing units in the data area 502, the spare area 504, the system area 506 and the replacement area 508 are various based on different memory module standards. Additionally, it has to be understood that the grouping relationships of grouping the physical erasing units into the data area 502, the spare area 504, the system area 506 and the replacement area 508 are dynamically changed during the operation of the memory storage apparatus 100. For example, when a physical erasing unit in the free area 504 is damaged and replaced by a physical erasing unit in the replacement area 508, the physical erasing unit in the replacement area 508 is associated with the free area 504.

With reference to FIG. 6, the memory controller 104 configures logical addresses LBA(0)~LBA(H) for mapping to the physical erasing units of the data area 502. And, when the host system 100 is about to write data into a logical address or update data stored in the logical address, the memory controller 104 gets a physical erasing unit from the free area 504 and writes the data into the gotten physical erasing unit for substituting the physical erasing unit of the data area 502.

In order to identify physical erasing units are used for storing data belonging to the logical addresses, in the present exemplary embodiment, the memory controller 104 records mapping between the logical addresses and the physical erasing units. And, when the host system 1000 is about to access data stored in a logical address, the memory controller 104 identifies a physical erasing unit mapping to the logical address, thereby accessing the data. For example, the memory controller 104 may store a logical-physical address mapping table in the rewritable non-volatile memory module 106 to record the physical erasing units mapping to the logical addresses, and when accessing data, the memory controller 104 loads the logical-physical address mapping table into the buffer memory 208 to maintain.

It should be noted that the memory storage apparatus 100 is equipped with a data protecting function and the data protecting function may be provided to different user groups. To be specific, in the present exemplary embodiment, the memory controller 104 groups the logical addresses LBA (0)~LBA(H) into a plurality of logical address groups, and respectively sets individual control rights for the logical address groups. That is, the control right of each of the logical address groups is set as "a readable status", "a read locked status (i.e., data can not be read)", "a writable status", "a write locked status (i.e., data can not be written)". For example, the logical addresses LBA(0)~LBA(H) are grouped into a first logical address group LBG(0) and a second logical address group LBG(1). It should be noted that, in the present exemplary embodiment, two logical address groups are configured, and the present invention is not limited thereto. The number of logical address groups may be designed according to the demand.

Figure 7:
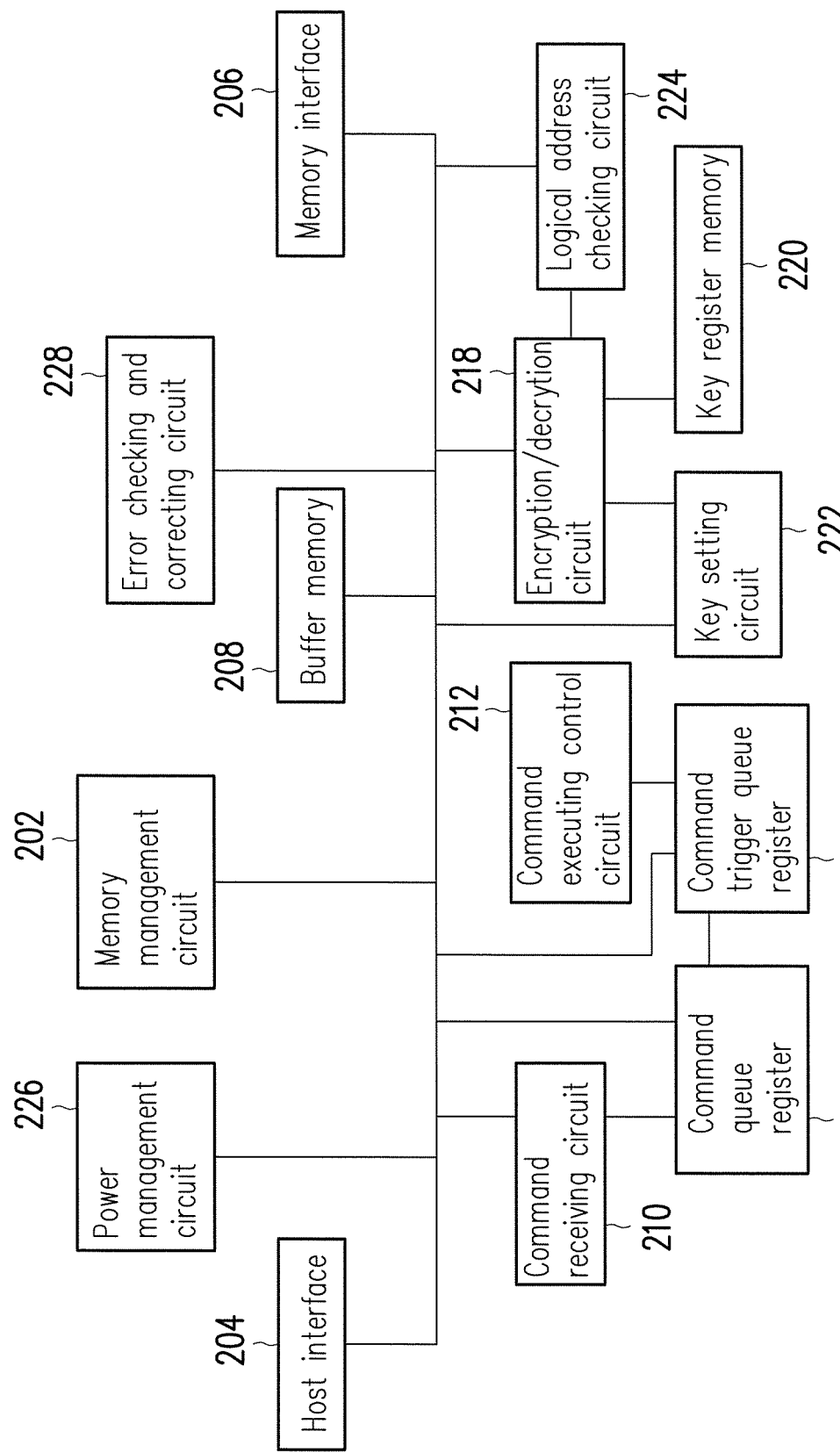
FIG. 7 is a schematic block diagram illustrating a memory controller according to an exemplary embodiment of the present invention.

FIG. 7 is a schematic block diagram illustrating a memory controller according to an exemplary embodiment of the present invention.

With reference to the FIG. 7, the memory controller 104 includes a memory managing circuit 202, a host interface 204, a memory interface 206, a buffer memory 208, a command receiving circuit 210, a command executing control circuit 212, a command queue register 214, a command trigger queue register 216, a encryption/decryption circuit 218, a key register memory 220, a key setting circuit 222, a logical address checking circuit 224, a power management circuit 226 and an error checking and correcting circuit 228.

The memory management circuit 202 is configured to control the whole operation of the memory controller 104. To be specific, the memory management circuit 202 has a plurality of control instructions, and the control instructions are executed to perform a data writing operation, a data reading operation, a data erasing operation and so on when the memory storage apparatus 100 is operated.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage apparatus 100 is in operation, the control instructions are executed by the microprocessor unit to write, read, and erase data.

In another exemplary embodiment of the invention, the control instructions of the memory management circuit 202 may also be stored in a specific area of the rewritable non-volatile memory module 106 (e.g., a system area of a memory module exclusively used for storing system data) in form of program codes. Additionally, the memory management circuit 202 has a microprocessor unit (not shown), a ROM (not shown), and a RAM (not shown). In particular, the ROM has boot codes, and when the memory controller 104 is enabled, the microprocessor unit first executes the boot codes to load the control instructions from the rewritable non-volatile memory module 106 into the RAM of the memory management circuit 202. The microprocessor unit then runs the control instructions to write, read, and erase data.

Moreover, the control instructions of the memory management circuit 202 may also be implemented in a hardware form according to another exemplary embodiment of the invention. For instance, the memory management circuit 202 includes a microcontroller, a memory management unit circuit, a memory writing unit circuit, a memory reading unit circuit, a memory erasing unit circuit, and a data processing unit circuit. The memory management unit circuit, the memory writing unit circuit, the memory reading unit circuit, the memory erasing unit circuit, and the data processing unit circuit are coupled to the microcontroller. The memory management unit circuit is configured to manage physical erasing units of the rewritable non-volatile memory module 106; the memory writing unit circuit is configured to issue a writing command to the rewritable non-volatile memory module 106 for writing data thereto; the memory reading unit circuit is configured to issue a reading command to the rewritable non-volatile memory module 106 for reading data therefrom; the memory erasing unit circuit is configured to issue an erasing command to the rewritable non-volatile memory module 106 for erasing data therefrom; the data processing unit circuit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the SATA standard. However, it should be understood that the invention is not limited thereto, and the host interface 204 may comply with the PATA standard, the IEEE 1394 standard, the PCI express standard, the USB standard, the SD standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

The buffer memory module 208 is coupled to the memory management circuit 202 and configured to temporarily hold data and commands received from the host system 1000 or data received from the rewritable non-volatile memory module 106. For instance, when a write command and data to be written are received from the host system 1000, the memory management circuit 202 temporarily stores the data into the buffer memory 208. And, when a read command and data to be read are read from the rewritable non-volatile memory module 106, the memory management circuit 202 temporarily stores the read data into the buffer memory 208.

The command receiving circuit 210 is coupled to the memory management circuit 202 and configured to receive commands from the host system 1000.

The command executing control circuit 212 is coupled to the memory management circuit 202 and configured to execute commands from the host system 1000.

The command queue register 214 and the command trigger queue register 216 are configured to temporarily store commands received from the host system 1000 and commands which are ready for executing, respectively. To be specific, in the present exemplary embodiment, the memory storage apparatus 100 supports the Native Command Queue function, wherein the command receiving circuit 210 puts commands received from the host system 1000 into the command queue register 214, the memory management circuit 202 generates an order for executing the commands according to the attributes (e.g., logical addresses to be accessed) of the commands and the command executing control circuit 212 executing the commands based on the order. It should be understood that, in the present exemplary embodiment, the command queue register 214 and the command trigger queue register 216 are implemented respectively in individual hardware circuits. However, the present invention is not limited thereto, and in another exemplary embodiment of the present invention, the memory management circuit 202 may divide a storage area from the buffer memory 208 as the command queue register 214 and the command trigger queue register 216.

Figure 8:
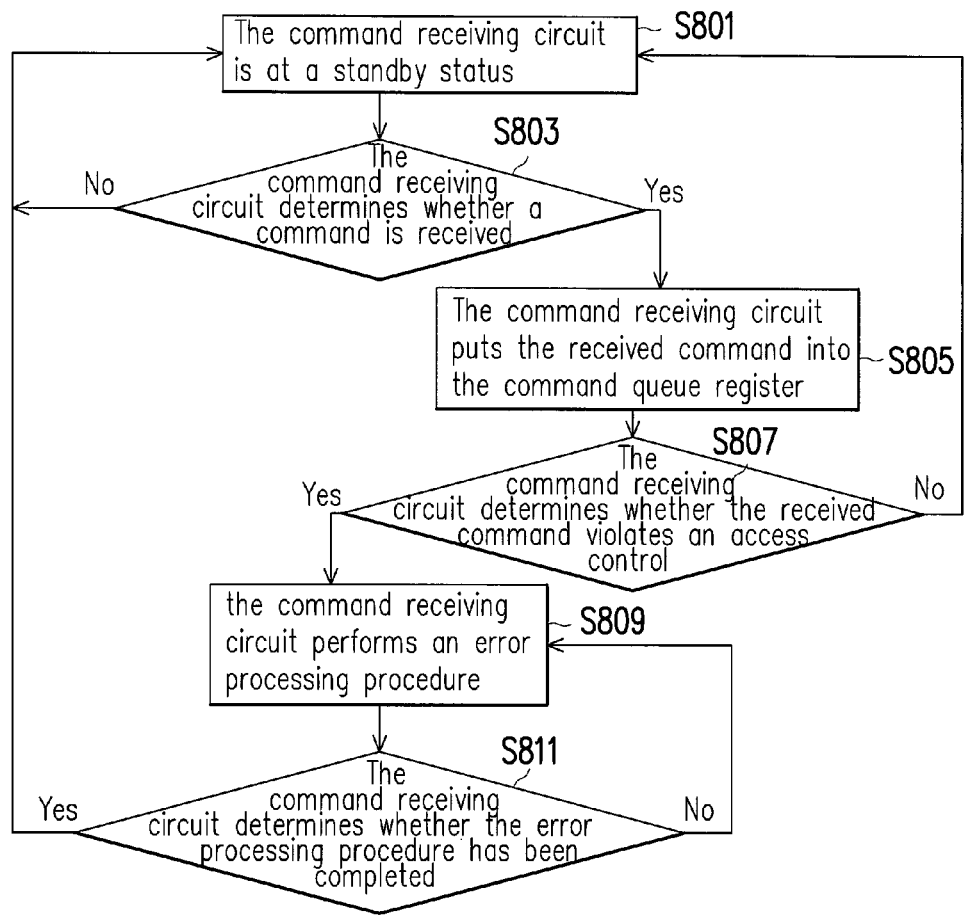
FIG. 8 and FIG. 9 are flowcharts of receiving commands and preparing to execute the commands according to the data access method of the exemplary embodiment of the present invention.
Figure 9:
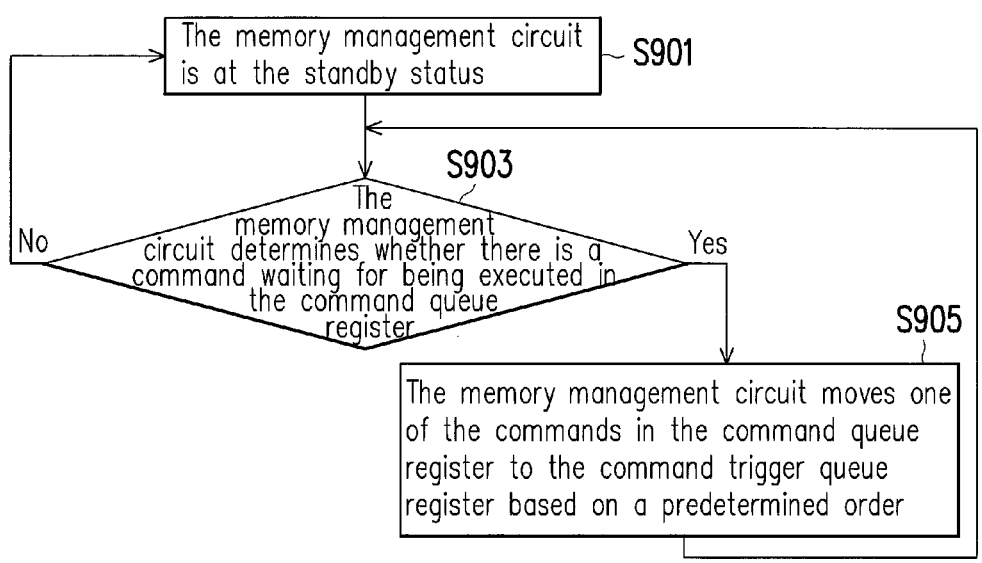

FIG. 8 and FIG. 9 are flowcharts of receiving commands and preparing to execute the commands according to the data access method of the exemplary embodiment of the present invention.

With reference to FIG. 8, first, in a block S801, the command receiving circuit 210 is at a standby status. That, in a block S803, the command receiving circuit 210 determines whether a command (e.g., a write command or a read command) is received. If no command is received, the command receiving circuit 210 returns to the standby status (i.e., the block S801).

If a command is received, in a block S805, the command receiving circuit 210 puts the received command into the command queue register 214 and in a block S807, the command receiving circuit 210 determines whether the received command violates an access control. For example, if the received command is a read command, the command receiving circuit 210 determines whether a logical address indicated by the command is at the read locked status and if the logical address indicated by the command is at the read locked status, the command receiving circuit 210 identifies that the received command violates the access control. For example again, if the received command is a write command, the command receiving circuit 210 determines whether a logical address indicated by the command is at the write locked status and if the logical address indicated by the command is at the write locked status, the command receiving circuit 210 identifies that the received command violates the access control.

If the received command does not violate the access control, the command receiving circuit 210 returns to the standby status (i.e., the block S801).

If the received command violates the access control, in a block S809, the command receiving circuit 210 performs an error processing procedure. For example, in the block S809, the command receiving circuit 210 removes all of the commands in the command queue register 214. And, in the block S811, the command receiving circuit 210 determines whether the error processing procedure has been completed. If the error processing procedure has not been completed, the command receiving circuit 210 continues to detect whether the error processing procedure has been completed (i.e., the block S811); and if the error processing procedure has been completed, the command receiving circuit 210 returns to the standby status (i.e., the block S801).

With reference to FIG. 9, in a block S901, the memory management circuit 202 is at the standby status and in a block S903, the memory management circuit 202 determines whether there is a command waiting for being executed in the command queue register 214.

If there is at least one command waiting for being executed in the command queue register 214, in a block S905, the memory management circuit 202 moves one of the commands in the command queue register 214 to the command trigger queue register 216 based on a predetermined order such that the command executing control circuit 212 executes the command and the operation in the block S903 is performed. If there is no command waiting for being executed in the command queue register 214, the memory management circuit 202 returns to the standby status (i.e., the block S901).

With reference to FIG. 7 again, the encryption/decryption circuit 218 is coupled to the command executing control circuit 212 and configured to encrypt or decrypt data. To be specific, data to be transmitted to the rewritable non-volatile memory module 106 is encrypted through the encryption/decryption circuit 218, and data read from the rewritable non-volatile memory module 106 is decrypted through the encryption/decryption circuit 218. In particular, the encryption/decryption circuit 218 uses a corresponding key to encrypt data according to a logical address indicated by the write command. For example, if the host system 1000 is about to store data into a logical address belonging to the first logical address group, the encryption/decryption circuit 218 encrypts the data with the key assigned to the first logical address group; and if the host system 1000 is about to store data into a logical address belonging to the second logical address group, the encryption/decryption circuit 218 encrypts the data with the key assigned to the second logical address group.

The key register memory 220 is coupled to the encryption/decryption circuit 218 and configured to temporarily store the keys for encrypting data and decrypting data.

The key setting circuit 222 is coupled to the encryption/decryption circuit 218 and configured to initially load the keys into the key register memory 220. In particular, in the exemplary embodiment, the key setting circuit 222 sets different keys for different logical address group. For example, in the present exemplary embodiment, the key setting circuit 222 sets a key (referred to as "the first key") to the first logical address group, sets a key (referred to as "the second key") to the second logical address group, and when the memory storage apparatus 100 is turned on, the first key and the second key are loaded into the key register memory 220.

Figure 10:
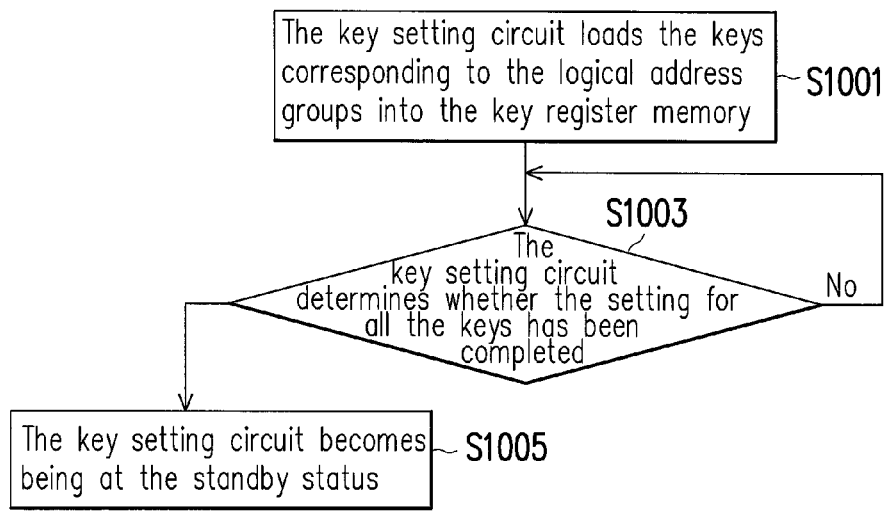
FIG. 10 is a flowchart illustrating the steps of initialing keys according to an exemplary embodiment.

FIG. 10 is a flowchart illustrating the steps of initialing keys according to an exemplary embodiment.

With reference to FIG. 10, when memory storage apparatus 100 is turned on, in a block S1001, the key setting circuit 222 loads the keys corresponding to the logical address groups into the key register memory 220, and in a block S1003, the key setting circuit 222 determines whether the setting for all the keys has been completed. If the setting for all of the keys has not been completed, the key setting circuit 222 continues to detect whether the setting for all of the keys has been completed (i.e., the block S1003); and if the setting for all of the keys has been completed, in a block S1005, the key setting circuit 222 becomes being at the standby status.

With reference to FIG. 7, the logical address checking circuit 224 is coupled to the encryption/decryption 218 and configured to identify a logical address indicated by a command given by the host system 1000. In the exemplary embodiment, the encryption/decryption circuit 218 selects a corresponding key according to the identifying by the logical address checking circuit 224 to encrypt data to be stored by the host system 1000 or decrypts data read from the rewritable non-volatile memory module 106. For example, in the present exemplary embodiment, the logical address checking circuit 224 identifies that a logical address accessed by a command read from the host system 1000 belongs to a first logical address group (or a second logical address group) and the encryption/decryption circuit 218 uses a first key (or the second) key to encrypt (or decrypt) data.

The power management circuit 226 is coupled to the memory management circuit 202 and configured to control the power of the memory storage apparatus 100.

The ECC circuit 228 is coupled to the memory management circuit 202 and configured to perform an ECC procedure to ensure data accuracy. To be specific, when the memory management circuit 202 receives a writing command from the host system 1000, the ECC circuit 228 generates an ECC code for data corresponding to the writing command, and the memory management circuit 202 writes the data and the corresponding ECC code into the rewritable non-volatile memory module 106. Thereafter, when reading the data from the rewritable non-volatile memory module 106, the memory management circuit 202 simultaneously reads the ECC code corresponding to the data, and the ECC circuit 228 performs the ECC procedure on the read data according to the corresponding ECC code.

In the present exemplary embodiment, when the command executing control circuit 212 executes a write command in the command trigger queue register 216, the command executing control circuit 212 enables the direct memory access (DMA) to the buffer memory 208 and data corresponding to the write command is transmitted to the rewritable non-volatile memory module 106; and when the command executing control circuit 212 executes a read command in the command trigger queue register 216, the command executing control circuit 212 enables the direct memory access (DMA) to the buffer memory 208 and data corresponding to the read command is transmitted to the host system 1000.

In particular, during the direct memory access, the logical address checking circuit 224 identifies each logical address (hereinafter referred to as "the target logical address") storing each sector data in the transmitted data and the logical address groups that the target logical addresses belong to, and the encryption/decryption circuit 218 encrypts or decrypts the sector data in the transmitted data with corresponding keys based on the identified logical address groups.

Figure 11:
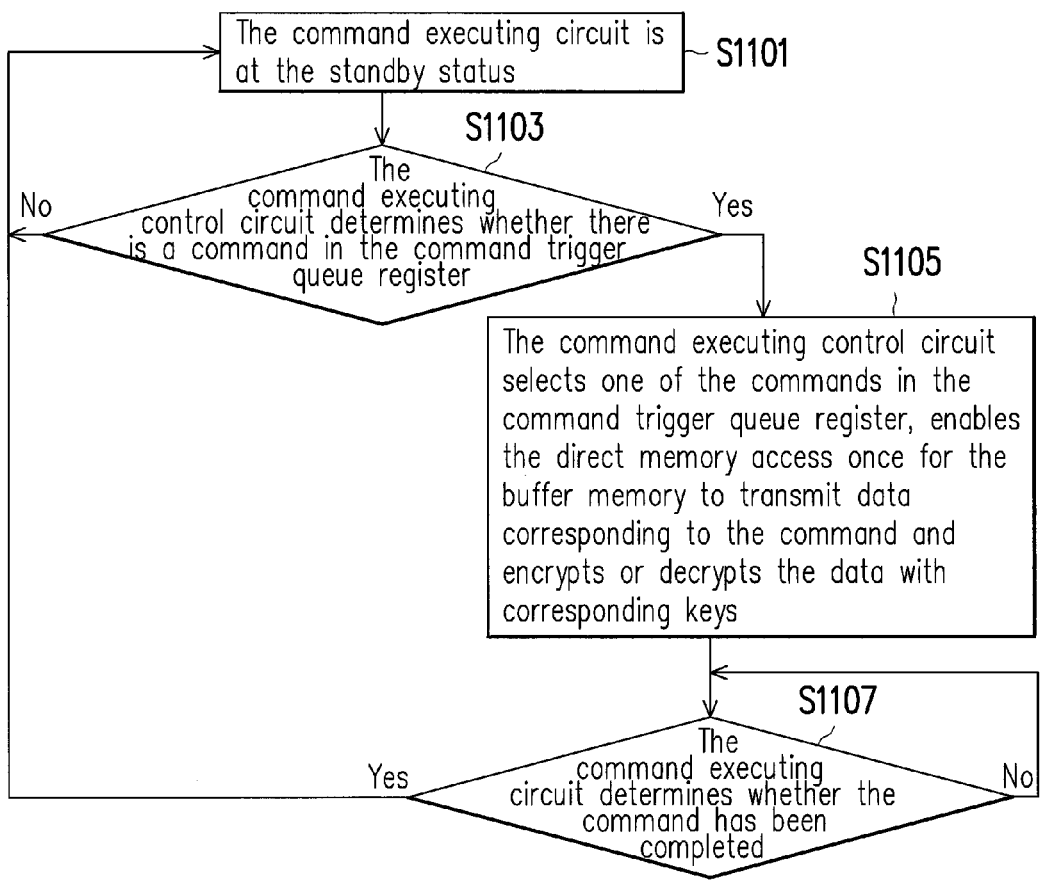
FIG. 11 is a flowchart illustrating the steps of executing commands according to an exemplary embodiment.

FIG. 11 is a flowchart illustrating the steps of executing commands according to an exemplary embodiment.

With reference to FIG. 11, in a block S1101, the command executing circuit 212 is at the standby status, and in a block S1103, the command executing control circuit 212 determines whether there is a command in the command trigger queue register 216.

If there is a command in the command trigger queue register 216, in a block S1105, the command executing control circuit 212 selects one of the commands in the command trigger queue register 216, enables the direct memory access once for the buffer memory 208 to transmit data corresponding to the command and encrypts or decrypts the data with corresponding keys. Herein, "the direct memory access once" means that the memory management circuit 202 instructs the command executing control circuit 212 to start to transmit data to the buffer memory or read data from the buffer memory and after the completion of the transmitting, the command executing control circuit 212 interrupts the memory management circuit 202 and informs the memory management circuit 202 that the transmitting has been finished.

In a block S1107, the command executing circuit 212 determines whether the command has been completed. If the command has not been completed, the command executing control circuit 212 continues to detect whether the command has been completed (i.e., the block S1107); and if he command has been completed, the command executing control circuit 212 returns to the standby status (i.e., the block S1101).

Figure 12:
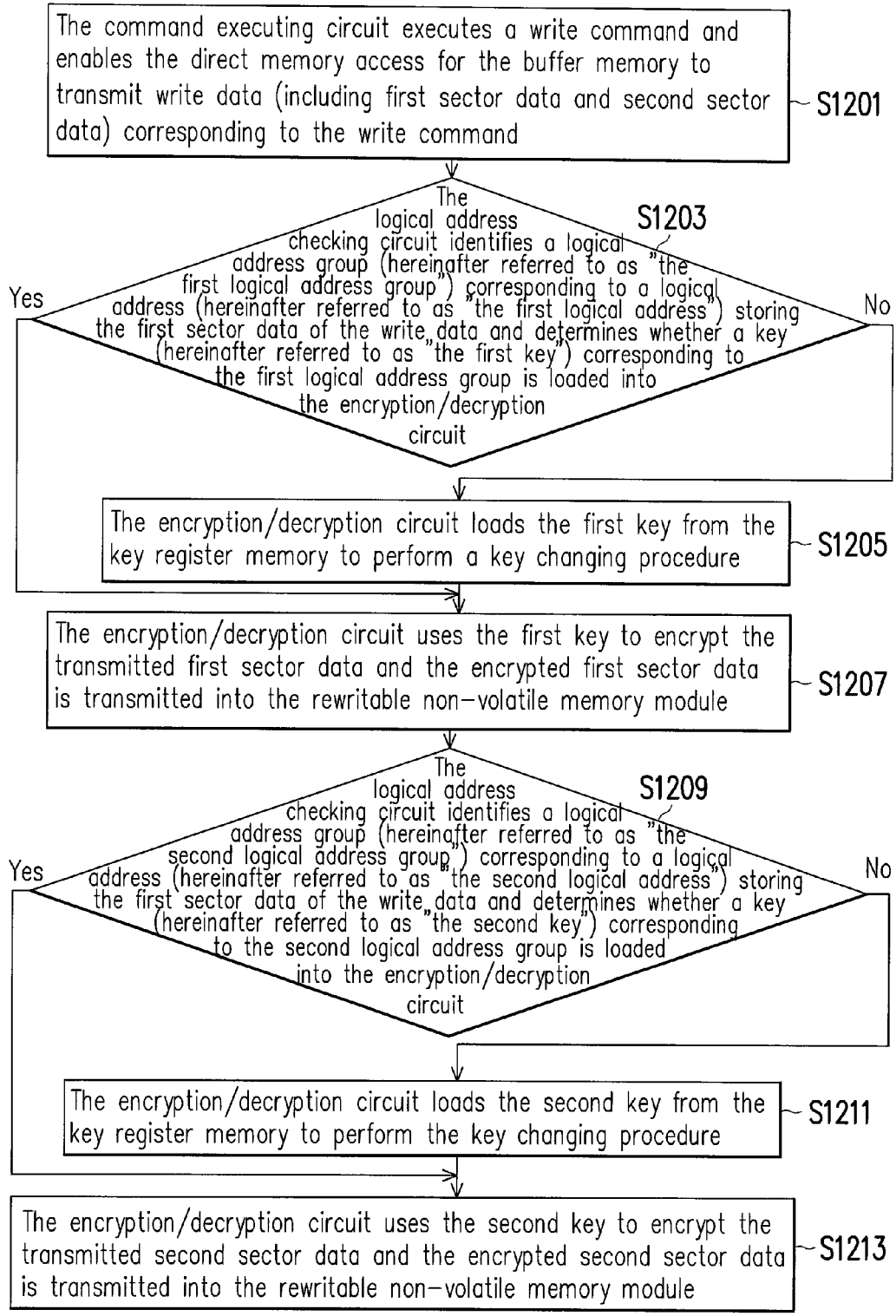
FIG. 12 is a flowchart illustrating the detail steps of executing a write command in the block S1105 shown in FIG. 11 according to an exemplary embodiment.

FIG. 12 is a flowchart illustrating the detail steps of executing a write command in the block S1105 shown in FIG. 11 according to an exemplary embodiment. In order to explain easily, the writing of two sector data is taken as an example for describing; however, the present invention is not limited thereto.

In a block S1201, the command executing circuit 212 executes a write command and enables the direct memory access for the buffer memory 208 to transmit write data (including first sector data and second sector data) corresponding to the write command.

In a block S1203, the logical address checking circuit 224 identifies a logical address group (hereinafter referred to as "the first logical address group") corresponding to a logical address (hereinafter referred to as "the first logical address") storing the first sector data of the write data and determines whether a key (hereinafter referred to as "the first key") corresponding to the first logical address group is loaded into the encryption/decryption circuit 218.

If the first key corresponding to the first logical address group is not loaded into the encryption/decryption circuit 218, in a block S1205, the encryption/decryption circuit 218 loads the first key from the key register memory 220 to perform a key changing procedure. Then, in a block S1207, the encryption/decryption circuit 218 uses the first key to encrypt the transmitted first sector data and the encrypted first sector data is transmitted into the rewritable non-volatile memory module 106.

In a block S1209, the logical address checking circuit 224 identifies a logical address group (hereinafter referred to as "the second logical address group") corresponding to a logical address (hereinafter referred to as "the second logical address") storing the second sector data of the write data and determines whether a key (hereinafter referred to as "the second key") corresponding to the second logical address group is loaded into the encryption/decryption circuit 218.

If the second key corresponding to the second logical address group is not loaded into the encryption/decryption circuit 218, in a block. S1211, the encryption/decryption circuit 218 loads the second key from the key register memory 220 to perform the key changing procedure. Then, in a block S1213, the encryption/decryption circuit 218 uses the second key to encrypt the transmitted second sector data and the encrypted second sector data is transmitted into the rewritable non-volatile memory module 106.

Figure 13:
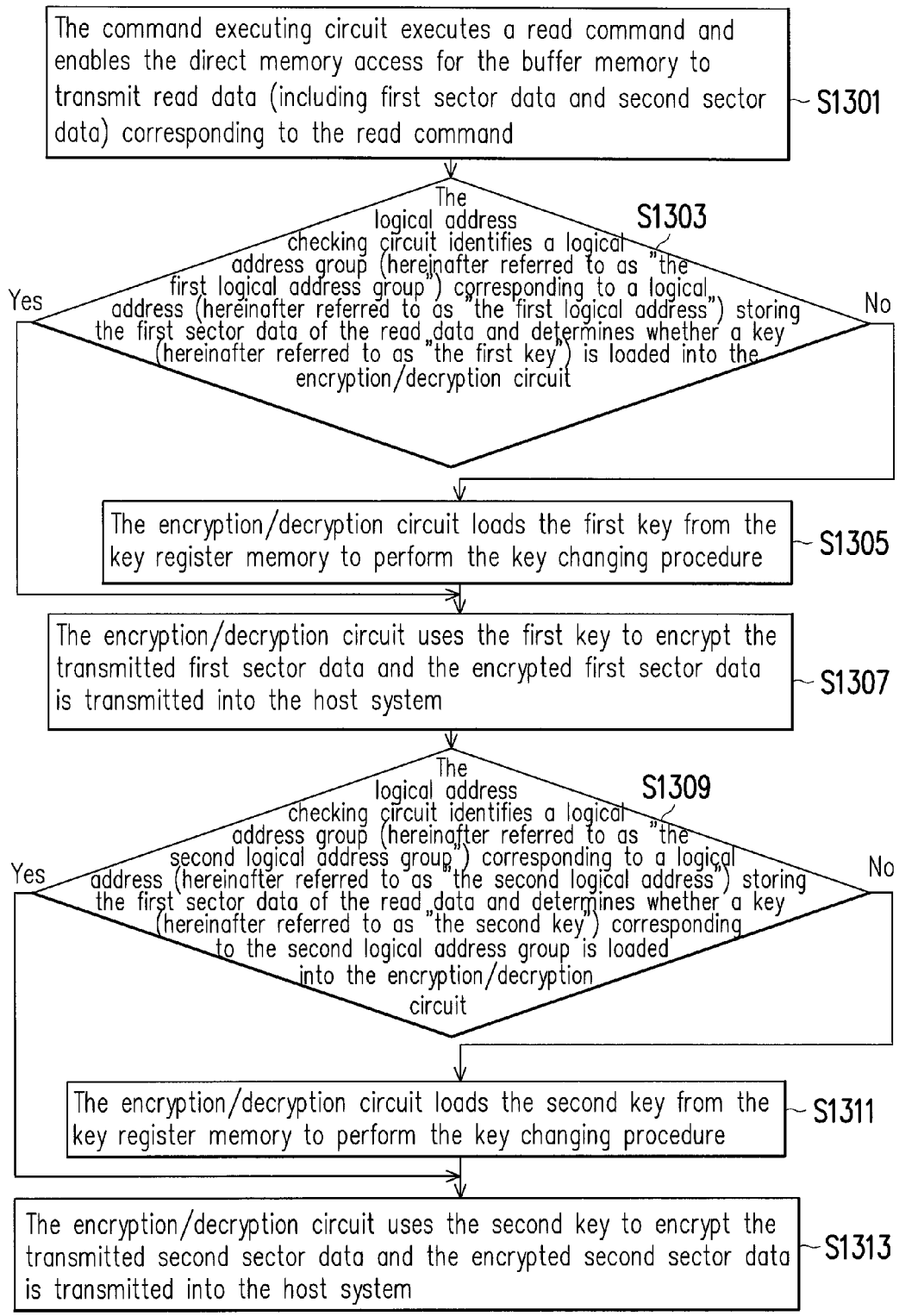
FIG. 13 is a flowchart illustrating the detail steps of executing a read command in the block S1105 shown in FIG. 11 according to an exemplary embodiment.

FIG. 13 is a flowchart illustrating the detail steps of executing a read command in the block S1105 shown in FIG. 11 according to an exemplary embodiment. In order to explain easily, the reading of two sector data is taken as an example for describing; however, the present invention is not limited thereto.

In a block S1301, the command executing circuit 212 executes a read command and enables the direct memory access for the buffer memory 208 to transmit read data (including first sector data and second sector data) corresponding to the read command. It should be noted, before enabling the direct memory access for the buffer memory 208 to transmit the read data, the memory management circuit 202 has read the read data into the buffer memory 208 form the rewritable non-volatile memory module 106.

In a block S1303, the logical address checking circuit 224 identifies a logical address group (hereinafter referred to as "the first logical address group") corresponding to a logical address (hereinafter referred to as "the first logical address") storing the first sector data of the read data and determines whether a key (hereinafter referred to as "the first key") is loaded into the encryption/decryption circuit 218.

If the first key corresponding to the first logical address group is not loaded into the encryption/decryption circuit 218, in a block S1305, the encryption/decryption circuit 218 loads the first key from the key register memory 220 to perform the key changing procedure. Then, in a block S1307, the encryption/decryption circuit 218 uses the first key to encrypt the transmitted first sector data and the encrypted first sector data is transmitted into the host system 1000.

In a block S1309, the logical address checking circuit 224 identifies a logical address group (hereinafter referred to as "the second logical address group") corresponding to a logical address (hereinafter referred to as "the second logical address") storing the first sector data of the read data and determines whether a key (hereinafter referred to as "the second key") corresponding to the second logical address group is loaded into the encryption/decryption circuit 218.

If the second key corresponding to the second logical address group is not loaded into the encryption/decryption circuit 218, in a block S1311, the encryption/decryption circuit 218 loads the second key from the key register memory 220 to perform the key changing procedure. Then, in a block S1313, the encryption/decryption circuit 218 uses the second key to encrypt the transmitted second sector data and the encrypted second sector data is transmitted into the host system 1000.

Based on the above, in the exemplary embodiments of the present invention, the command executing method, the memory controller and the memory storage apparatus are capable of using corresponding keys to encrypt data belongs to different logical address groups in one command by enabling the direct memory access once, thereby improving the performance of data accessing. Additionally, in the command executing method, the memory controller and the memory storage apparatus, the receiving of commands and the executing of commands are independently, and therefore the efficiency of executing command can be increased. The previously described exemplary embodiments of the present invention have the advantages aforementioned, wherein the advantages aforementioned not required in all versions of the invention.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A command executing method for a memory storage apparatus, the command executing method comprising:
    grouping a plurality of logical addresses corresponding to the memory storage apparatus into a plurality of logical address groups;
    assigning a plurality of keys to the logical address groups respectively, wherein each of the keys is assigned to one logical address group among the logical address groups;
    receiving a write command and write data corresponding to the write command from a host system and temporarily storing the write data into a buffer memory, wherein the write data includes a plurality of sector data, the write command indicates writing the plurality of sector data into a plurality of target logical addresses among the logical addresses and the target logical addresses belong to at least two different logical address groups among the logical address groups; and
    executing the write command, enabling a direct memory access of the buffer memory once to transfer the write data from the buffer memory to a rewritable non-volatile memory module of the memory storage apparatus, determining and loading the keys corresponding to the at least two different logical address groups, and during the direct memory access:
        identifying each of the target logical addresses storing each of the plurality of sector data in the transferred write data and one of the at least two different logical address groups that each of the target logical addresses belong to, and
        encrypting the plurality of sector data in the transferred write data by an encryption/decryption circuit with the keys corresponding to the at least two different logical address groups of the target logical addresses in during the direct memory access of transferring the write data from the buffer memory to the rewritable non-volatile memory module.

2. The command executing method according to claim 1, wherein the logical address groups include a first logical address group and a second logical address group, a first key among the keys is assigned to the first logical address group and a second key among the keys is assigned to the second logical address group,
    wherein the plurality of sector data includes first sector data and second sector data, and the write command indicates writing the first sector data into a first logical addresses belonging to the first logical address group among the logical addresses and indicates writing the second sector data into a second logical addresses belonging to the second logical address group among the logical addresses,
    wherein encrypting the plurality of sector data in the transferred write data with the keys corresponding to the logical address groups of the target logical addresses comprises:
    during the transferring of the first sector data, determining whether the first key assigned to the first logical address group has been loaded into the encryption/decryption circuit;
    during the transferring of the first sector data, loading the first key into the encryption/decryption circuit if the first key assigned to the first logical address group has not been loaded into the encryption/decryption circuit;
    during the transferring of the first sector data, encrypting the transferred first sector data with the first key by the encryption/decryption circuit, wherein the encrypted first sector data is written into the rewritable non-volatile memory module;

during the transferring of the second sector data, determining whether the second key assigned to the second logical address group has been loaded into the encryption/decryption circuit;

during the transferring of the first sector data, loading the second key into the encryption/decryption circuit if the second key assigned to the second logical address group has not been loaded into the encryption/decryption circuit;

during the transferring of the first sector data, encrypting the transferred second sector data with the second key by the encryption/decryption circuit, wherein the encrypted second sector data is written into the rewritable non-volatile memory module.

3. The command executing method according to claim 1, wherein assigning the keys to the logical address groups respectively comprises:

initially loading the keys into a key register memory.

4. The command executing method according to claim 1, wherein receiving the write command and the write data corresponding to the write command and temporarily storing the write data into the buffer memory comprises:

receiving the write command and putting the write command into a command queue register by a command receiving circuit;

determining whether the target logical addresses indicated by the write command are set as being in a write locked status; and removing the write command from the command queue register by the command receiving circuit if the target logical addresses indicated by the write command are set as being in a write locked status.

5. The command executing method according to claim 4, further comprising:

moving the write command from the command queue register to a command trigger queue register by a memory management circuit.

6. The command executing method according to claim 5, further comprising:

before executing the write command and enabling the direct memory access to transfer the write data from the buffer memory to the rewritable non-volatile memory module of the rewritable non-volatile memory module, selecting the write command from the command trigger queue register.

7. The command executing method according to claim 1, further comprising:

receiving a read command from the host system, wherein the read command indicates reading data from the target logical addresses;

reading read data belonging to the target logical addresses from the rewritable non-volatile memory module to the buffer memory by a memory management circuit; and executing the read command, enabling the direct memory access once to transfer the read data from the buffer memory to the host system and decrypting the plurality of sector data of the transferred read data by the encryption/decryption circuit with the keys corresponding to the logical address groups of the target logical addresses.

8. A memory controller, comprising:

a memory interface configured to be coupled to a rewritable non-volatile memory module;

a host interface configured to couple to a host system;

a buffer memory;

a memory management circuit coupled to the memory interface, the host interface and the buffer memory;

a command receiving circuit coupled to the memory management circuit;

a command executing control circuit coupled to the memory management circuit; and an encryption/decryption circuit coupled to the command executing control circuit, wherein the memory management circuit is configured to group a plurality of logical addresses into a plurality of logical address groups and respectively assign a plurality of keys to the logical address groups, wherein each of the keys is assigned independently to one of the logical address groups, wherein the command receiving circuit is configured to receive a write command and write data corresponding to the write command from the host system and temporarily store the write data into the buffer memory, wherein the write data includes a plurality of sector data, the write command indicates writing the plurality of sector data into a plurality of target logical addresses among the logical addresses and the target logical addresses belong to at least two different logical address groups, wherein the command executing control circuit is configured to execute the write command and enable a direct memory access of the buffer memory once to transfer the write data from the buffer memory to a rewritable non-volatile memory module of the memory storage apparatus, and to determine and load the keys corresponding to the at least two different logical address groups, and during the direct memory access, the control circuit is further configured to identify each of the target logical addresses storing each of the plurality of sector data in the transferred write data and one of the at least two different logical address groups that each of the target logical addresses belong to, and the encryption/decryption circuit is configured to encrypt the plurality of sector data of the transferred write data with the keys corresponding to the at least two different logical address groups of the target logical addresses during the direct memory access of transferring the write data from the buffer memory to the rewritable non-volatile memory module.

9. The memory controller according to claim 8 further comprising:

a logical address checking circuit coupled to the encryption/decryption circuit, wherein the logical address groups include a first logical address group and a second logical address group, a first key among the keys is assigned to the first logical address group and a second key among the keys is assigned to the second logical address group, wherein the plurality of sector data includes first sector data and second sector data, and the write command indicates writing the first sector data into a first logical addresses belonging to the first logical address group among the logical addresses and indicates writing the second sector data into a second logical addresses belonging to the second logical address group among the logical addresses, wherein the operation of encrypting the plurality of sector data of the write data with the keys corresponding to the logical address groups of the target logical addresses, during the transferring of the first sector data, the logical address checking circuit is configured to identify the first logical address indicated by the write command and identify the first logical address group corresponding to the first logical address, and the encryption/decryption circuit determines whether the first key assigned to the first logical address group has been loaded into the encryption/decryption circuit according to the identifying of the logical address checking circuit;

during the transferring of the first sector data, the encryption/decryption circuit loads the first key into the encryption/decryption circuit if the first key assigned to the first logical address group has not been loaded into the encryption/decryption circuit;

during the transferring of the first sector data, the encryption/decryption circuit encrypts the transferred first sector data with the first key, wherein the encrypted first sector data is written into the rewritable non-volatile memory module;

during the transferring of the second sector data, the logical address checking circuit is configured to identify the second logical address indicated by the write command and identify the second logical address group corresponding to the second logical address, and the encryption/decryption circuit determines whether the second key assigned to the second logical address group has been loaded into the encryption/decryption circuit according the identifying of the logical address checking circuit;

during the transferring of the second sector data, the encryption/decryption circuit loads the second key into the encryption/decryption circuit if the second key assigned to the second logical address group has not been loaded into the encryption/decryption circuit; and during the transferring of the second sector data, the encryption/decryption circuit encrypts the transferred second sector data with the second key, wherein the encrypted second sector data is written into the rewritable non-volatile memory module.

10. The memory controller according to claim 8 further comprising:

a key register memory and a key setting circuit respectively coupled to the encryption/decryption circuit, wherein the key setting circuit initially loads the keys into the key register memory.

11. The memory controller according to claim 8 further comprising:

a command queue register, wherein the command receiving circuit receives the write command, puts the write command into the command queue register and determines whether the target logical addresses indicated by the write command are set as being in a write locked status, wherein the command receiving circuit removes the write command from the command queue register if the target logical addresses indicated by the write command are set as being in a write locked status.

12. The memory controller according to claim 11 further comprising:

a command trigger queue register, wherein the memory management circuit moves the write command from the command queue register to a command trigger queue register.

13. The memory controller according to claim 12, wherein the command executing control circuit selects the write command from the command trigger queue register to execute.

14. The memory controller according to claim 8, wherein the command receiving circuit is further configured to receive a read command from the host system, wherein the read command indicates reading data from the target logical addresses, wherein the memory management circuit reads read data belonging to the target logical addresses from the rewritable non-volatile memory module to the buffer memory, wherein the command executing control circuit executes the read command and enables the direct memory access once to transfer the read data from the buffer memory to the host system, and the encryption/decryption circuit decrypts the plurality of sector data of the transferred read data with the keys corresponding to the logical address groups of the target logical addresses.

15. A memory storage apparatus, comprising:

a connector configured to electrically connect to a host system;

a rewritable non-volatile memory module; and a memory control circuit coupled to the connector and the rewritable non-volatile memory module, wherein the memory control circuit is configured to group a plurality of logical addresses corresponding to the memory storage apparatus into a plurality of logical address groups, wherein the memory control circuit is further configured to assign a plurality of keys to the logical address groups respectively, wherein each of the keys is assigned independently to one of the logical address groups, wherein the memory control circuit is further configured to receive a write command and write data corresponding to the write command from the host system and temporarily store the write data into the buffer memory, wherein the write data includes a plurality of sector data, the write command indicates writing the plurality of sector data into a plurality of target logical addresses among the logical addresses and the target logical addresses belong to at least two different logical address groups, wherein the memory control circuit is further configured to execute the write command, enable a direct memory access of the buffer memory once to transfer the write data from the buffer memory to a rewritable non-volatile memory module of the memory storage apparatus, determine and load the keys corresponding to the at least two different logical address groups, and during the direct memory access, the control circuit is further configured to identify each of the target logical addresses storing each of the plurality of sector data in the transferred write data and one of the at least two different logical address groups that each of the target logical addresses belong to, and encrypt the plurality of sector data of the transferred write data with the keys corresponding to the at least two different logical address groups of the target logical addresses in during the direct memory access of transferring the write data from the buffer memory to the rewritable non-volatile memory module.

16. The memory storage apparatus according to claim 15, wherein the logical address groups include a first logical address group and a second logical address group, a first key among the keys is assigned to the first logical address group and a second key among the keys is assigned to the second logical address group, wherein the plurality of sector data includes first sector data and second sector data, and the write command indicates writing the first sector data into a first logical addresses belonging to the first logical address group among the logical addresses and indicates writing the second sector data into a second logical addresses belonging to the second logical address group among the logical addresses, during the transferring of the first sector data, the memory control circuit determines whether the first key assigned to the first logical address group has been loaded, and if the first key assigned to the first logical address group has not been loaded, the memory control circuit loads the first key, and the memory control circuit encrypts the transferred first sector data with the first key, wherein the encrypted first sector data is written into the rewritable non-volatile memory module, during the transferring of the second sector data, the memory control circuit determines whether the second key assigned to the second logical address group has been loaded, and if the second key assigned to the second logical address group has not been loaded, the memory control circuit loads the second key, and the memory control circuit encrypts the transferred second sector data with the second key, wherein the encrypted second sector data is written into the rewritable non-volatile memory module.

17. The memory storage apparatus according to claim 15, wherein the memory control circuit initially loads the keys into a key register memory.

18. The memory storage apparatus according to claim 15, wherein the memory control circuit receives the write command, puts the write command into the command queue register and determines whether the target logical addresses indicated by the write command are set as being in a write locked status, wherein the memory control circuit removes the write command from the command queue register if the target logical addresses indicated by the write command are set as being in a write locked status.

19. The memory storage apparatus according to claim 18, wherein the memory control circuit moves the write command from the command queue register to a command trigger queue register.

20. The memory storage apparatus according to claim 19, wherein before executing the write command and enabling the direct memory access to transfer the write data from the buffer memory to the rewritable non-volatile memory module of the rewritable non-volatile memory module, the memory control circuit selects the write command from the command trigger queue register.

21. The memory storage apparatus according to claim 15, wherein the memory control circuit is further configured to receive a read command from the host system, wherein the read command indicates reading data from the target logical addresses, wherein the memory control circuit reads read data belonging to the target logical addresses from the rewritable non-volatile memory module to the buffer memory, where the memory control circuit executes the read command, enables the direct memory access once to transfer the read data from the buffer memory to the host system and decrypt the plurality of sector data of the transferred read data with the keys corresponding to the logical address groups of the target logical addresses.

* * * * *